Patented Feb. 8, 1944

2,341,420

UNITED STATES PATENT OFFICE 2,341,420

FORMIC ACID ESTERS

Edward P. Bartlett, Wilmington, Del., assignor to E. I. du Pont de Nemours & Company, Wilmington, Del., a corporation of Delaware No Drawing. Application November 24, 1939, Serial No. 305,929

7 Claims. (Cl. 260—488)

This invention relates to a process for the preparation of formic acid esters and to the products of that process. It more particularly relates to the preparation of polyhydric alcohol polyformates by the interaction of polyhydric alcohols with carbon monoxide and to the product of such reactions.

An object of the present invention is to provide an improved process for the preparation of formic acid esters. Another object of the invention is to provide a process for the preparation of formates by the interaction of polyhydric alcohols, monoalkyl ethers of polyhydric alcohols or monoalkyloxy ethers of polyhydric alcohols with carbon monoxide. A further object of the invention is to provide a process for the preparation of glycol diformate by the interaction of ethylene glycol with carbon monoxide in the presence of an alkali metal glycolate or other alkoxide catalyst. Still another object involves the preparation of polyformic acid esters of the polyhydric alcohols by interacting the latter with carbon monoxide under suitable temperature and pressure conditions in the presence of their respective alkali metal alcoholates or other alkali metal alkoxide catalyst. Other objects and advantages of the invention will hereinafter appear.

The process may be described as involving the following steps of dissolving in the polyhydric alcohol or ether derivative therof an alkaline catalyst such as an alkali or an alkaline earth metal, or mixing a suitable alkaline catalyst such as an alkali metal or alkaline earth metal alkoxide, with a polyhydric alcohol or ether derivative thereof, contacting the resulting mixture with carbon monoxide in a suitable reaction vessel, raising the temperature until the reaction starts and when the reaction is substantially complete separating the formate from the reaction mixture.

The polyhydric alcohols which may be reacted in accord with the invention include ethylene glycol, propylene glycol, diethylene glycol, triethylene glycol, and the higher analogous and homologous polyhydric alcohols, as well as glycerol and the like. Derivatives of the polyhydric alcohols in which the OH, or the H of the OH, is substituted may also be used, providing there is present a free hydroxyl group in the molecule. Such derivatives include the monoalkyl ethers of ethylene gylcol and the above-designated glycols, e. g., monomethyl, ethyl, propyl and higher ethers of ethylene glycol, the monoaryl ethers of ethylene glycol, such as monobenzyl and monotolyl ethers of the alcohol, and the monoalkoxy alkyl ethers of ethylene glycol, such as may be designated by the formula, $ROCH_2O(CH_2)_2OH$, which, generically, represents such alcohols as (methoxy methoxy) ethanol, $CH_3OCH_2O(CH_2)_2OH$; (ethoxy methoxy) ethanol, $C_2H_5OCH_2O(CH_2)_2OH$; (propoxy methoxy) ethanol, $C_3H_7OCH_2O(CH_2)_2OH$; (butoxy methoxy) ethanol, $$C_4H_9OCH_2O(CH_2)_2OH;$$

(methoxy isopropoxy) ethanol, $$CH_3OC(CH_3)_3O(CH_2)_2OH;$$

(methoxy ethoxy methoxy) ethanol, $$CH_3O(CH_2)OCH_2O(CH_2)_2OH;$$

(alpha-methoxy ethoxy) ethanol, $$CH_3OCH(CH_3)O(CH_2)_2OH;$$

and (alpha-ethoxy ethoxy) ethanol, $$C_2H_5OCH(CH_3)O(CH_2)_2OH;$$

similarly, higher substituted alcohols are included such, for example, as (methoxy methoxy) propanol, $CH_3OCH_2O(CH_2)_3OH$; beta-(methoxy methoxy) propanol, $CH_3OCH_2OCH(CH_3)CH_2OH$; (methoxy methoxy) butanol, $$CH_3OCH_2O(CH_2)_4OH;$$

and the higher corresponding alcohols as well as their homologues. Other specific examples which may likewise be included are the mono-(methoxy methyl) ether of diethylene glycol, $$CH_3OCH_2O(CH_2)_2O(CH_2)_2OH,$$

as well as the corresponding (ethoxy methyl), (propoxy methyl), (butoxy methyl), (methoxy ethoxy methyl) ethers of diethylene glycol, as well as triethylene glycol. These alcohols are prepared in accord with the process described in the copending application of Sidney Sussman, 288,587, filed August 5, 1939, which involves, primarily, the interaction of an acetal and principally formals with a polyhydric alcohol having at least one unsubstituted hydroxyl group in the presence of a suitable acidic-type catalyst such as sulfuric acid. Another class of alcohols is likewise included which is prepared by the hydrogenation of the product obtained by the process of the copending application of Donald J. Loder et al., S. N. 256,855. These alcohols have the chemical formula $CH_2OH(CH_2O)n(CH_2)_2OH$, in which $n$ is one or more.

The polyhydric alcohol acid monoesters may likewise be converted to the corrosponding formates. Examples of this class of compounds are the ethylene glycol monoalkyl esters, such as ethylene glycol monomethyl acetate, ethylene glycol monoethyl acetate, ethylene glycol monomethyl propionate, diethylene glycol monoethyl ether acetate, and the like.

In addition to the above polyhydric alcohols in which the OH group or the hydrogen of the OH group is substituted by organic groups, there may be reacted, in accord with my invention, polyhydric alcohols in which these groups are substituted by an inorganic group, providing, of course, there is present in the resulting compound a free hydroxyl group. Examples of members of this class of compounds include the hydrins, such as chlorhydrin, alpha-propylene chlorhydrin, trimethylene chlorhydrin, and the like.

Generally, it is advantageous to work at moderately elevated temperatures, but the reaction proceeds also at ordinary temperatures with sufficient speed, if the carbon monoxide is brought into intimate contact with the liquid. The temperature may range from in the order of 50° to 250° C. with the preferred temperature between approximately 60° and 150° C. The reaction, as has been indicated, is conducted preferably at superatmospheric pressures usually in the neghborhood of 10 to 700 atmospheres, although the reaction will proceed down to in the proximity of atmospheric pressures and also at pressures above 700 atmospheres.

In addition to the alkali and alkaline earth metal alkoxide catalysts disclosed, other alkaline catalysts may be used, such as the formates of the same metals. Such catalysts as, for example, sodium formate usually require a somewhat higher temperature to be as effective as the alkoxide-type catalyst, i. e., temperatures of 100° C. or above.

The carbon monoxide used in this reaction may be derived from any suitable source and is preferably substantially pure and particularly free from gases which will contaminate the ester produced or form undesirable products. There may be present with the carbon monoxide, however, diluent gases which do not enter into the reaction such, for example, as nitrogen, hydrogen, or methane and similar inert diluents.

Examples will now be given illustrating preferred embodiments of the invention, which is not restricted to the particular details therein given. The parts are by weight unless otherwise indicated.

*Example 1.*—An autoclave was charged with a mixture of 3542 parts containing approximately 3495 parts of ethylene glycol, in which was dissolved 47 parts of metallic sodium. Carbon monoxide was introduced into the closed autoclave and the pressure therein increased by the introduction of carbon monoxide until a pressure between 200 and 400 atmospheres was obtained. The temperature was raised to between 70° and 100° C. and held within approximately that range for 5½ hours. Ethylene glycol diformate was obtained.

*Example 2.*—An autoclave was charged with 3321 parts of a mixture containing 3285 parts of propylene glycol, in which had been dissolved 36 parts of metallic sodium. Carbon monoxide was introduced and the pressure raised thereby to between 200 and 400 atmospheres. The temperature was raised to between 70° and 100° C. and the reaction held between these temperature limits for approximately 5 hours. The product was distilled and the distillate was found to contain:

|   | Per cent |
|---|---|
| Formic acid | 1.8 |
| Water | 0.7 |
| Propylene glycol | 19.3 |
| Propylene glycol monoformate | 41.9 |
| Propylene glycol diformate | 36.3 |

Propylene diformate has a boiling point of 116° C. at 101 mm., a refractive index to the sodium lime of 1.4130 at 23° C. and a density of 1.136 at 25° C. It is water-white, odorless, and soluble in all proportions in alcohol and ether and to the extent of 8.6 grams in 100 cc. of water at room temperature.

*Example 3.*—The reaction illustrated by Example 1 was repeated using 3575 parts of a mixture containing 3481 parts of ethylene glycol, in which had been dissolved 94 parts of sodium metal. The same pressure, temperature and time of reaction specified in Example 1 were used. However, because of the higher concentration of catalyst, reaction rate was greater and the product richer in ester. The products from the two syntheses were combined and distilled. Analysis of the distillate showed:

|   | Per cent |
|---|---|
| Formic acid | 4.7 |
| Water | 2.5 |
| Ethylene glycol | 17.0 |
| Ethylene glycol monoformate | 55.0 |
| Ethylene glycol diformate | 20.8 |

The polyhydric alcohol formates of this invention are particularly useful as solvents for extracting purposes, as solvents in cellulose ester and ether lacquers and the like and especially for use as intermediates in organic synthesis.

From a consideration of the above specification, it will be appreciated that many changes may be made therein without departing from the scope of the invention or sacrificing any of the advantages that may be derived therefrom.

I claim:

1. A process for the preparation of the formate ester of a monoether of a polyhydric alcohol which comprises passing carbon monoxide into a liquid monoether of the polyhydric alcohol in the presence of a metal alkoxide catalyst at pressures above atmospheric and at temperatures between 50° and 275° C.

2. A process for the preparation of the formate ester of a monoether of ethylene glycol which comprises passing carbon monoxide into a liquid monoether of ethylene glycol in the presence of a metal alkoxide catalyst at pressures above atmospheric and at temperatures between 50° and 275° C.

3. A process for the preparation of the formate ester of a monoalkyl ether of ethylene glycol which comprises passing carbon monoxide into a liquid monoalkyl ether of ethylene glycol in the presence of a metal alkoxide catalyst at pressures above atmospheric and at temperatures between 50° and 275° C.

4. A process for the preparation of compounds selected from the group consisting of polyhydric alcohol formates and ether substituted polyhydric alcohol formates which comprises reacting a compound selected from the group consisting of polyhydric alcohols, and monoalkyl ether substituted polyhydric alcohols containing at least one free hydroxyl group, with carbon monoxide in the presence of an alkaline catalyst.

5. A process for the preparation of ether substituted polyhydric alcohol formates which comprises contacting carbon monoxide and a monoalkyl ether substituted polyhydric alcohol, i. e., a polyhydric alcohol in which a hydroxyl group has been substituted but which ether-substituted polyhydric alcohol retains at least one free hydroxyl group, with a catalyst selected from the group consisting of alkali metal and alkaline earth metal alkoxides.

6. A process for the preparation of formate esters which comprises contacting carbon monoxide and a monoalkyl ether substituted polyhydric alcohol containing at least one free hydroxyl group with a metal alkoxide catalyst at pressures above atmospheric and at temperatures between 50° and 275° C.

7. A process for the preparation of formate esters which comprises contacting carbon monoxide and a monoalkyl ether substituted polyhydric alcohol containing at least one free hydroxyl group with a metal alkoxide catalyst.

EDWARD P. BARTLETT.

CERTIFICATE OF CORRECTION.

Patent No. 2,341,420.  February 8, 1944.

EDWARD P. BARTLETT.

It is hereby certified that error appears in the printed specification of the above numbered patent requiring correction as follows: Page 1, second column, line 19, for that portion of the formula reading "$(CH_2)OCH_2O$" read --$(CH_2)_2OCH_2O$--; page 2, first column, line 8, for "corrosponding" read --corresponding--; line 35-36, for "neghborhood" read --neighborhood--; and that the said Letters Patent should be read with this correction therein that the same may conform to the record of the case in the Patent Office.

Signed and sealed this 25th day of April, A. D. 1944.

Leslie Frazer

(Seal)  Acting Commissioner of Patents.